US011556901B2

(12) United States Patent
Kurokami et al.

(10) Patent No.: US 11,556,901 B2
(45) Date of Patent: Jan. 17, 2023

(54) PREVENTIVE MAINTENANCE SYSTEM OF MACHINE TOOL

(71) Applicant: FANUC CORPORATION, Yamanashi (JP)

(72) Inventors: Noboru Kurokami, Yamanashi (JP); Shinichi Ogawa, Yamanashi (JP); Kazunori Miyashita, Yamanashi (JP); Daisuke Mochizuki, Yamanashi (JP); Hidefumi Kawano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/743,171

(22) Filed: Jan. 15, 2020

(65) Prior Publication Data

US 2020/0234253 A1 Jul. 23, 2020

(30) Foreign Application Priority Data

Jan. 22, 2019 (JP) .............................. JP2019-008439

(51) Int. Cl.
*G06Q 10/00* (2012.01)
*G05B 19/4155* (2006.01)

(52) U.S. Cl.
CPC ......... *G06Q 10/20* (2013.01); *G05B 19/4155* (2013.01); *G05B 2219/4708* (2013.01)

(58) Field of Classification Search
CPC ................ G06Q 10/20; G05B 19/4155; G05B 2219/4708
See application file for complete search history.

(56) References Cited

U.S. PATENT DOCUMENTS

| 4,428,055 A | * | 1/1984 | Zurbrick | ............ | G05B 19/4015 |
| | | | | | 702/56 |
| 4,849,741 A | * | 7/1989 | Thomas | ............. | G05B 19/4065 |
| | | | | | 73/104 |

(Continued)

FOREIGN PATENT DOCUMENTS

| CN | 102785126 | * 11/2012 | ............. B23Q 15/20 |
| JP | S57-003541 U | 1/1982 | |

(Continued)

OTHER PUBLICATIONS

CNC Cookbook, "G-Code and M-code Reference List for Milling", Available online Jun. 20, 2019, pp. 9 downloaded from the internet https://www.cnccookbook.com/g-code-m-code-reference-list-cnc-mills/ (Year: 2019).*

(Continued)

*Primary Examiner* — Rocio Del Mar Perez-Velez
*Assistant Examiner* — Olvin Lopez Alvarez
(74) *Attorney, Agent, or Firm* — Studebaker & Brackett PC (57) ABSTRACT

A preventive maintenance system of a machine tool capable of making determination of presence of an abnormality mechanically and automatically, which has conventionally been performed on the basis of the feeling of an operator and detecting an abnormality more accurately in an earlier stage is provided. The preventive maintenance system includes: a vibration detection unit attached to a mechanism of a machine tool to detect vibration; a sound detection unit that detects acoustic waves produced when a work is machined by the machine tool; a servo motor current value detection unit that detects a current value of a servo motor; an abnormality determination unit that compares the vibration, the acoustic waves, and the current value of the servo motor during operation of the machine tool with vibration data, acoustic wave data, and current value data in a normal state (Continued)

set in advance to determine presence of an abnormality in the mechanism of the machine tool; and a detection start/end command setting unit that adds commands for a detection start point and a detection end point of at least one of the vibration, the acoustic waves, and the current value of the servo motor to a machining program.

7 Claims, 2 Drawing Sheets

(56) References Cited

U.S. PATENT DOCUMENTS

| | | | |
|---|---|---|---|
| 6,167,325 A | 12/2000 | Kamiguchi et al. | |
| 6,263,464 B1* | 7/2001 | Iafrate | G01R 31/3004 714/724 |
| 6,353,874 B1* | 3/2002 | Morein | G06F 12/0802 711/134 |
| 6,937,942 B2 | 8/2005 | Lee | |
| 7,925,017 B2* | 4/2011 | Shirai | G11B 20/00507 380/201 |
| 10,195,682 B2 | 2/2019 | Fagan | |
| 10,464,220 B2* | 11/2019 | Tanaka | B25J 9/1692 |
| 10,493,576 B2 | 12/2019 | Sonoda et al. | |
| 10,635,081 B2 | 4/2020 | Nakahama | |
| 10,747,197 B2 | 8/2020 | Satou et al. | |
| 10,761,063 B2* | 9/2020 | Kurokami | G01N 29/14 |
| 2005/0256605 A1* | 11/2005 | Maeda | G05B 19/404 700/193 |
| 2005/0289077 A1* | 12/2005 | Yajima | G06Q 20/20 705/62 |
| 2006/0111018 A1* | 5/2006 | Kopp | B23F 17/001 451/5 |
| 2010/0106215 A1* | 4/2010 | Stubbs | A61N 1/025 607/37 |
| 2010/0257327 A1* | 10/2010 | Kosugi | B41J 2/17546 714/799 |
| 2015/0051728 A1* | 2/2015 | Kim | G05B 19/4061 700/175 |
| 2015/0112475 A1* | 4/2015 | Murakawa | G05B 19/19 700/189 |
| 2016/0041070 A1* | 2/2016 | Wascat | G05B 23/024 702/183 |
| 2016/0299488 A1* | 10/2016 | Ogawa | G05B 19/4065 |
| 2016/0377506 A1* | 12/2016 | Bizub | G01H 1/006 702/35 |
| 2017/0185061 A1* | 6/2017 | Otsuki | G05B 19/12 |
| 2017/0209974 A1* | 7/2017 | Angel | B23Q 17/0985 |
| 2017/0249052 A1* | 8/2017 | Nishi | G06F 3/0416 |
| 2017/0277174 A1* | 9/2017 | Maeda | G05B 19/41875 |
| 2017/0357243 A1* | 12/2017 | Takayama | G06N 3/08 |
| 2018/0018641 A1 | 1/2018 | Jussel et al. | |
| 2018/0043488 A1 | 2/2018 | Sonoda et al. | |
| 2018/0164757 A1* | 6/2018 | Matsushima | G05B 13/042 |
| 2018/0246494 A1 | 8/2018 | Nakahama | |
| 2019/0171199 A1* | 6/2019 | Unuma | G05B 23/0264 |
| 2019/0294144 A1 | 9/2019 | Takahara et al. | |
| 2020/0001420 A1* | 1/2020 | Sarup | B23Q 17/2208 |
| 2020/0234253 A1 | 7/2020 | Kurokami et al. | |
| 2020/0272125 A1 | 8/2020 | Okudera et al. | |

FOREIGN PATENT DOCUMENTS

| | | | | |
|---|---|---|---|---|
| JP | S61-061742 A | | 3/1986 | |
| JP | S62-136344 A | | 6/1987 | |
| JP | H04-141342 A | | 5/1992 | |
| JP | H06-043920 A | | 2/1994 | |
| JP | H08-126940 A | | 5/1996 | |
| JP | H10-286743 A | | 10/1998 | |
| JP | H11-170142 A | | 6/1999 | |
| JP | H11-234433 A | | 8/1999 | |
| JP | 2000052182 | * | 2/2000 | B23Q 11/00 |
| JP | 2004-042208 A | | 2/2004 | |
| JP | 2005-074545 A | | 3/2005 | |
| JP | 2005-199379 A | | 7/2005 | |
| JP | 2006-130604 A | | 5/2006 | |
| JP | 2007272545 | * | 10/2007 | G05B 19/4063 |
| JP | 2008828 | * | 1/2008 | B23Q 17/12 |
| JP | 2011-118840 A | | 6/2011 | |
| JP | 2014196987 | * | 10/2014 | G01N 33/4833 |
| JP | 20172017170578 | * | 9/2017 | B23Q 17/09 |
| JP | 2018103284 A | | 7/2018 | |
| JP | 111451837 | * | 7/2020 | G05B 19/406 |
| JP | 2020116667 | * | 8/2020 | G05B 19/406 |
| WO | WO2004076122 | * | 9/2004 | B23Q 11/08 |
| WO | WO2008142386 | * | 11/2008 | G05B 19/4065 |
| WO | 2017/056264 A1 | | 4/2017 | |

OTHER PUBLICATIONS

American Micro, "The Differences Between G Code and M Code", Jun. 2019, pp. 7, downloaded from the internet https://www.americanmicroinc.com/difference-g-code-m-code.html (Year: 2019).*
Green Tool Systems, "List of M-codes", Dec. 8, 2018, 2018, pp. 7, downloaded from the internet https://web.archive.org/web/20181208122013/http://greenetool.com:80/troubleshooting-carbide-cutting-tools/list-of-m-codes/ (Year: 2018).*
Downey et al, "Real time monitoring of the CNC process in a production environment—the data collection & analysis phase", pp. 920-926, 2015, downloaded from the internet https://www.sciencedirect.com/science/article/pii/S2212827115010872 (Year: 2015).*
An Office Action mailed by the United States Patent and Trademark Office dated Mar. 4, 2021, which corresponds to U.S. Appl. No. 16/743,171 and is related to U.S. Appl. No. 16/743,171.
An Office Action; "Notice of Reasons for Refusal," mailed by the Japanese Patent Office dated Mar. 2, 2021, which corresponds to Japanese Patent Application No. 2019-008439 and is related to U.S. Appl. No. 16/743,171 ; with English language translation.
An Office Action; "Notice of Reasons for Refusal," mailed by the Japanese Patent Office dated Mar. 2, 2021, which corresponds to Japanese Patent Application No. 2019-008438 and is related to U.S. Appl. No. 16/743,171 ; with English language translation.
An Office Action issued by the United States Patent and Trademark Office dated Sep. 7, 2021, which corresponds to U.S. Appl. No. 16/743,154 and is related to U.S. Appl. No. 16/743,171.
A "Reconsideration Report by Examiner before Appeal", mailed by the Japanese Patent Office dated Feb. 22, 2022, which corresponds to Japanese Patent Application No. 2019-008438 and is related to U.S. Appl. No. 16/743,171 with English language translation.
An Office Action; "Notice of Reasons for Refusal", mailed by the Japanese Patent Office dated Mar. 15, 2022, which corresponds to Japanese Patent Application No. 2019-008439 and is related to U.S. Appl. No. 16/743,171 with English language translation.

* cited by examiner

PREVENTIVE MAINTENANCE SYSTEM OF MACHINE TOOL

This application is based on and claims the benefit of priority from Japanese Patent Application No. 2019-008439, filed on 22 Jan. 2019, the content of which is incorporated herein by reference.

BACKGROUND OF THE INVENTION

Field of the Invention

The present invention relates to a preventive maintenance system of a machine tool.

Related Art

Conventionally, a machine tool such as an NC lathe or a machining center numerically controls a moving amount, a moving velocity, and the like of a tool using a computerized numerical control (CNC) technology with the aid of a computer to repeat the same machining procedure and automate machining or the like of a complex shape to a high degree. Moreover, data created by CAD and CAM is fetched into a CNC lathe, and various pieces of data such as options, parameters, an NC program, a macro program, macro variables, a work origin offset, a tool offset, tool shape data, and tool management data are input and controlled to automate a machine tool from designing to manufacturing systematically.

Patent Document 1: Japanese Unexamined Patent Application, Publication No. 2018-103284

SUMMARY OF THE INVENTION

On the other hand, when an abnormality occurs in a mechanism (a main driving system) of a machine tool, abnormal vibration or abnormal sound is produced during operation of the machine tool and an operator senses the vibration or the sound to know occurrence of an abnormality in the mechanism of the machine tool.

However, when the presence of an abnormality in the machine tool is determined on the basis of the feeling of an operator, the determination of presence of an abnormality may be affected by the skill, experience, and the like of the operator, determination is made differently from person to person, and a determination period is different from person to person.

Due to this, there is a case in which it is not possible to find an abnormality accurately in an early stage, and depending on a case, a machining operation is continued in an abnormal state to produce defective products, decrease productivity, and aggravate machine failures.

The present invention has been made in view of the above-described problems, and an object thereof is to provide a preventive maintenance system of a machine tool capable of making determination of presence of an abnormality mechanically and automatically, which has conventionally been performed on the basis of the feeling of an operator and detecting an abnormality more accurately in an earlier stage.

The present inventor found means capable of making determination of presence of an abnormality mechanically and automatically, which were performed on the basis of the feeling of an operator and detecting an abnormality more accurately in an earlier stage and accomplished the present invention.

(1) The present invention is characterized in that it includes: at least one detection unit among: a vibration detection unit (for example, a vibration detection unit 13 to be described later) attached to a mechanism (for example, a spindle 2, a telescopic cover 10, or an ATC shutter 12 to be described later) of a machine tool (for example, a machine tool 1 to be described later) to detect vibration; a sound detection unit (for example, a sound detection unit 15 to be described later) provided in the vicinity of the mechanism of the machine tool to detect acoustic waves produced during operation of the machine tool; and a servo motor current value detection unit (for example, a servo motor current value detection unit 16 to be described later) that detects a current value of a servo motor (for example, a servo motor 4 to be described later) of a driving device (for example, a driving device 6 to be described later) of the machine tool; an abnormality determination unit (for example, an abnormality determination unit 14 to be described later) that compares at least one detection value among the vibration detected by the vibration detection unit, the acoustic waves detected by the sound detection unit, and the current value detected by the servo motor current value detection unit during operation of the machine tool with at least one piece of data among vibration data, acoustic wave data, and current value data of the servo motor in a normal state acquired in advance to determine presence of the mechanism; and a detection start/end command setting unit (for example, a detection start/end command setting unit 18 to be described later) that adds commands for a detection start point and a detection end point of at least one of the vibration, the acoustic waves, and the current value of the servo motor to a machining program.

Here, in (1) described above, the "mechanism of the machine tool" is not limited to "an inner mechanism and a driving mechanism of a body portion of the machine tool" that machines a machining target work in a strict sense of meaning but includes a peripheral facility mechanism such as an automatic tool changer (ATC) and an incidental facility mechanism such as a telescopic cover.

(2) In the present invention of (1) described above, M codes for setting the commands for the detection start point and the detection end point of at least one of the vibration, the acoustic waves, and the current value of the servo motor may be provided in the machining program, and the detection start/end command setting unit may set the detection start point and the detection end point according to the set commands of the M codes which are auxiliary functions for performing machining.

(3) The present invention of (1) or (2) described above may further include: a determination result display unit (for example, a determination result display unit 19 to be described later) that displays comparison results between at least one of the vibration, the acoustic waves, and the current value of the servo motor detected during operation of the machine tool and at least one of the vibration data, the acoustic wave data, and the current value data of the servo motor in a normal state set in advance by applying the comparison results to a reference list; and a warning unit (for example, a warning unit 20 to be described later) that issues a warning when it is determined that there is an abnormality in the mechanism of the machine tool.

(4) In the present invention of any one of (1) to (3) described above, the mechanism may include at least one of a spindle (for example, a spindle 2 to be described later) that supports a tool (for example, a tool 3 to be described later), a telescopic cover (for example, a telescopic cover 10 to be described later) for preventing adhesion of cutting chips and/or cutting liquid produced due to machining, and an ATC shutter (for example, an ATC shutter 12 to be described later) for protecting a tool magazine (for example, a tool magazine 11 to be described later).

(5) In the present invention of any one of (1) to (4) described above, a plurality of machine tools may be provided in a plant, and the preventive maintenance system may include a plant central management screen display unit (for example, a plant central management screen display unit 22 to be described later) that shows the machine tool which is determined to be abnormal by the abnormality determination unit on a plant central management screen.

According to the present invention, it is possible to detect a current value of a servo motor or vibration and sound produced by a telescopic cover, an ATC shutter (a magazine cover, a shutter cover, and the like), and the like for preventing cutting chips and cutting liquid from adhering a spindle and a feed axis that support a tool of a machine tool, a tool magazine, and the like to protect the mechanisms to automatically detect an abnormality in the mechanism.

In this way, it is possible to make determination of presence of an abnormality mechanically and automatically, which has conventionally been performed on the basis of the feeling of an operator and detect an abnormality more accurately in an earlier stage.

Therefore, a machining operation will not be continued in an abnormal state, and it is possible to effectively prevent production of defective products, decrease in productivity, aggravation of machine failures.

DETAILED DESCRIPTION OF THE INVENTION

Hereinafter, a preventive maintenance system of a machine tool according to an embodiment of the present invention will be described with reference to FIGS. 1 and 2.

Here, the present embodiment relates to a preventive maintenance system of a machine tool capable of making determination of presence of an abnormality mechanically and automatically to detect an abnormality more accurately in an earlier stage.

Figure 1:
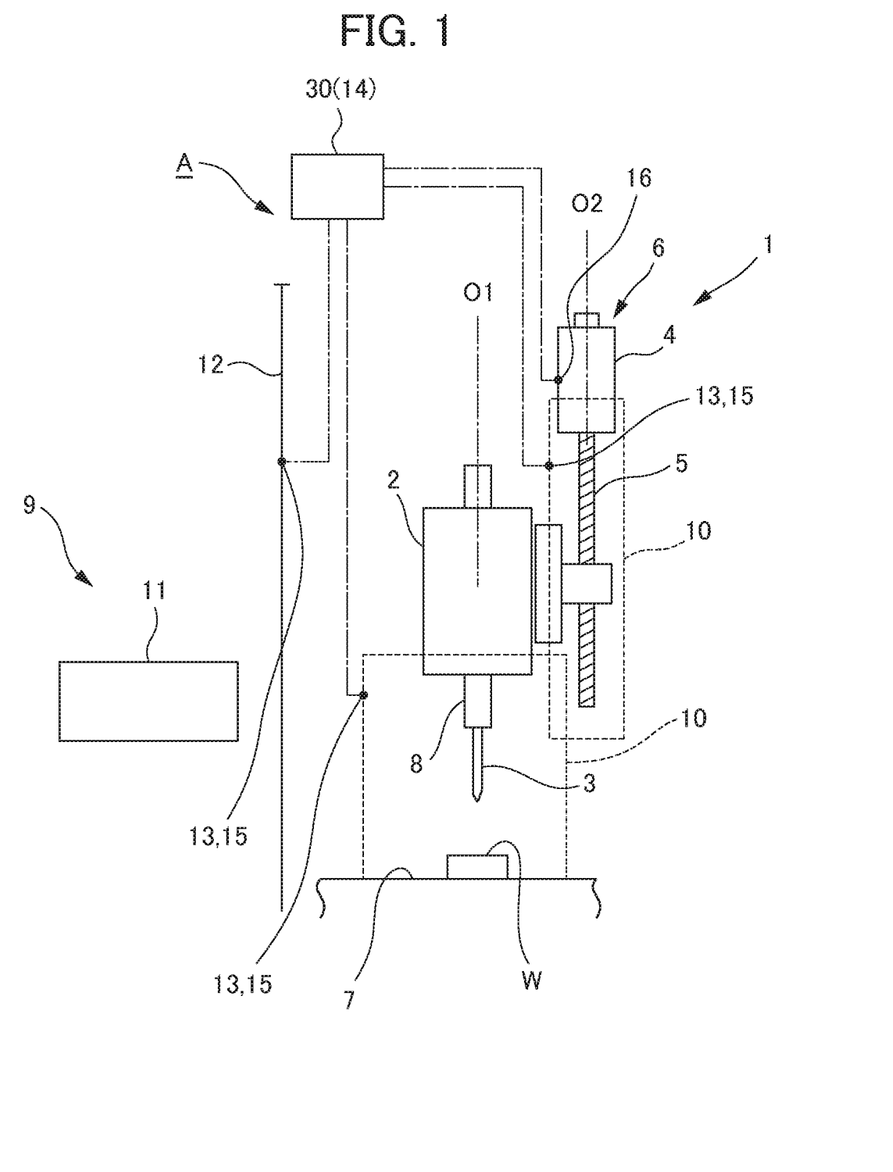
FIG. 1 is a diagram illustrating a machine tool and a preventive maintenance system of the machine tool according to an embodiment of the present invention.

Specifically, first, a machine tool 1 according to the present embodiment is a machine tool such as an NC lathe or a machining center, and as illustrated in FIG. 1, includes, for example, a spindle 2 arranged to face an axial line O1 in an up-down direction, a rotation driving means (a spindle motor: not shown) for rotating the spindle 2 around the axial line O1, a tool 3 attached to the spindle 2, a driving device 6 that rotates a feed axis 5 around an axial line O2 extending in an up-down direction in a normal direction and a reverse direction and allows the spindle 2 so as to advance and retract in an up-down direction with the aid of a servo motor 4 to thereby position the spindle 2 and the tool 3, a table 7 disposed under the spindle 2 and the tool 3 to fix and support a machining target work W on an upper surface thereof and so as to be movable in relation to the spindle 2 and the tool 3 in an up-down direction (Z) and a front-rear direction (horizontal directions of front, rear, left, and right directions: XY), and a preventive maintenance system A of the machine tool.

The tool 3 is detachably connected to the spindle 2 with a holder 8 disposed therebetween in a state in which the axial lines O1 thereof are on the same axis. In the present embodiment, although the spindle 2 rotates around the axial line O1, there is no limitation thereto. For example, the machine tool 1 may include an approximately cylindrical spindle arranged to face the axial line O1 in an up-down direction, a rotary axis supported inside the spindle with a bearing disposed therebetween so as to be rotatable around the axial line O1, and a rotation driving means for rotating the rotary axis, the tool 3 is detachably connected to the rotary axis with the holder 8 disposed therebetween, and the tool 3 is attached to the spindle.

The machine tool 1 of the present embodiment further includes an automatic tool changer (ATC) 9 that automatically changes the tool 3 and a telescopic cover 10 for preventing cutting chips and cutting liquid from adhering the driving device 6 (the feed axis 5 or the like) or the like of the machine tool body to protect the driving device 6 or the like in addition to a machine tool body including the spindle 2, the rotation driving means, the driving device 6, the table 7, and the like.

The ATC 9 includes, for example, a magazine 11 that stores the tool 3, an intermediate arm (not shown) that picks the tool 3 out of the magazine 11, an ATC arm (not shown) that changes the tool 3, and an ATC shutter (a magazine cover and a shutter cover) 12 for preventing cutting chips and cutting liquid from adhering the magazine 11 and the arms to protect the magazine 11 and the arms. According to NC code commands, the ATC shutter 12 is open when changing a tool so that storing of the tool 3, rotation and positioning of the magazine 11, and changing of the tool 3 in the magazine 11 and the tool 3 of the spindle 2 are performed.

Figure 2:
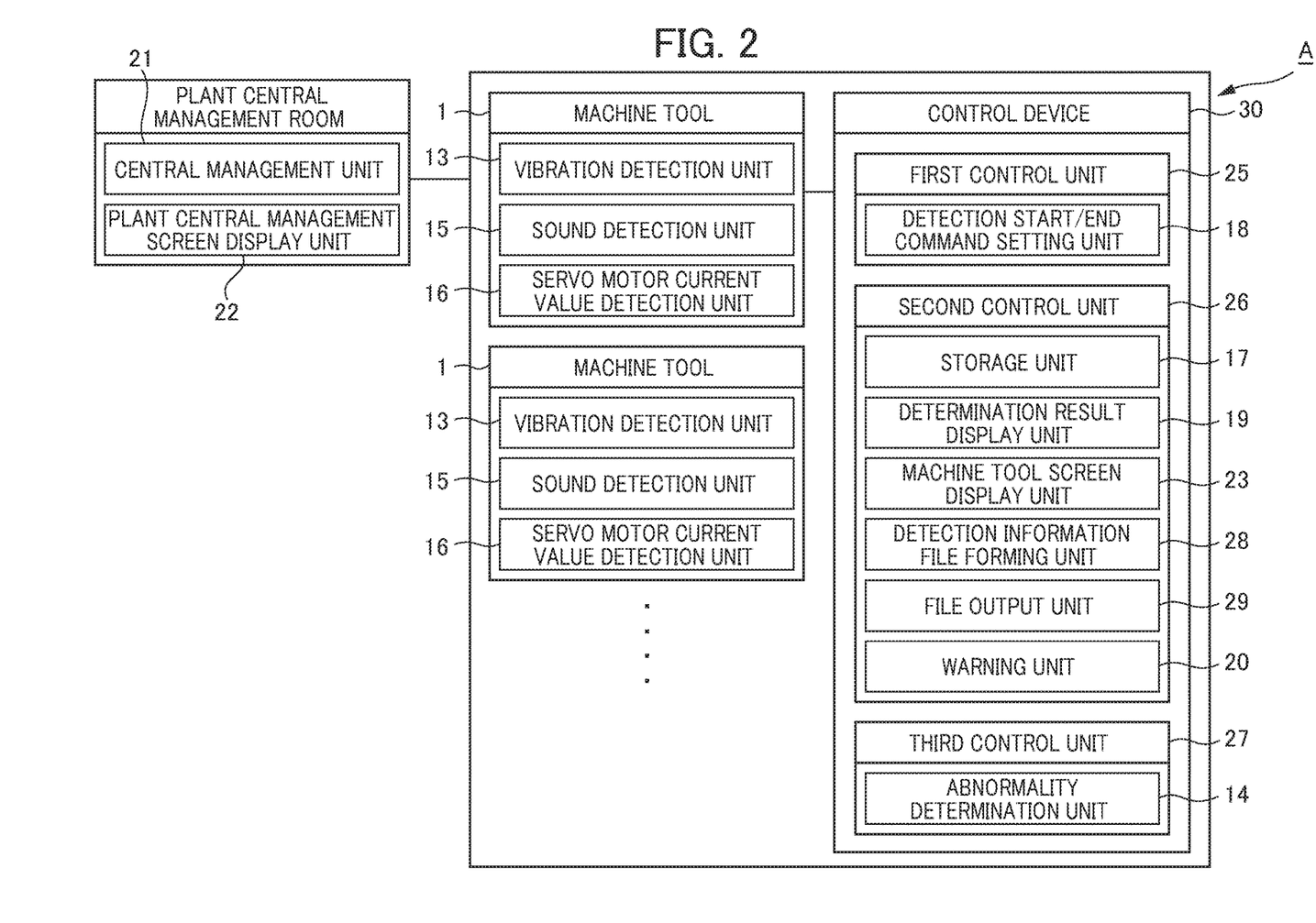
FIG. 2 is a block diagram illustrating a preventive maintenance system of the machine tool according to an embodiment of the present invention.

On the other hand, as illustrated in FIGS. 1 and 2, the preventive maintenance system A of the machine tool according to the present embodiment includes: a vibration detection unit (a vibration sensor: a detection unit) 13 attached to a mechanism of the machine tool 1 such as the spindle 2 that supports the tool 3, the telescopic cover 10, and the ATC shutter 12 to detect vibration, and an abnormality determination unit 14 that compares the vibration detected by the vibration detection unit 13 during operation of the machine tool 1 with vibration data in a normal state acquired in advance to determine presence of an abnormality in the mechanism (including mechanisms other than the spindle 2, the telescopic cover 10, and the ATC shutter 12).

The preventive maintenance system A of the machine tool further includes a sound detection unit (an acoustic sensor: a detection unit) 15 provided in the vicinity of the spindle 2, the telescopic cover 10, and the ATC shutter 12 of the machine tool 1 to detect acoustic waves (sound) produced during operation of the machine tool 1. The abnormality determination unit 14 compares the acoustic waves detected by the sound detection unit 15 during operation of the machine tool 1 with acoustic wave data in a normal state acquired in advance to determine presence of an abnormality in a mechanism of the machine tool 1.

The preventive maintenance system A of the machine tool further includes a servo motor current value detection unit (a detection unit) 16 that detects a current value of the servo motor 4. The abnormality determination unit 14 compares the current value detected by the servo motor current value detection unit 16 during operation of the machine tool 1 with a current value in a normal state acquired in advance to determine presence of an abnormality of the mechanism of the machine tool 1.

The preventive maintenance system A of the machine tool includes a storage unit 17 that stores the detected vibration, acoustic waves, and current value and stores the vibration, acoustic waves, and check valves in a normal state.

That is, in the preventive maintenance system A of the machine tool according to the present embodiment, the abnormality determination unit 14 determines the presence of an abnormality in the mechanism of the machine tool 1 on the basis of the vibration, the acoustic waves, and the current value detected by the vibration detection unit 13, the sound detection unit 15, and the servo motor current value detection unit 16 and the information data of the vibration, the acoustic waves, and the current value in a normal state stored in the storage unit 17.

In the present invention, the preventive maintenance system A of the machine tool may include at least one of the vibration detection unit 13, the sound detection unit 15, the servo motor current value detection unit 16, and the abnormality determination unit 14 may determine an abnormality in the mechanism of the machine tool 1. Moreover, the expression "the vicinity of the mechanism of the machine tool 1" in the present invention indicates a region around a mechanism of the machine tool 1 determined by arbitrarily selecting mechanism (in the present embodiment, the spindle 2, the telescopic cover 10, and the ATC shutter 12 are selected) on the basis of the acoustic waves detected by the sound detection unit 12 and arbitrarily selecting the region in which presence of an abnormality in the mechanism can be determined.

The preventive maintenance system A of the machine tool according to the present embodiment includes: a detection start/end command setting unit 18 for adding commands (for setting commands) for a detection start point and a detection end point of at least one of vibration, acoustic waves, and a current value of a servo motor to a machining program, a determination result display unit 19 that displays a comparison result between at least one of the vibration, the acoustic waves, and the current value of the servo motor 4 detected during operation of the machine tool 1 and at least one of the vibration data, the acoustic wave data, and the current value data of the servo motor 4 in a normal state set in advance by applying the comparison result to a reference list, and a warning unit 20 that issues a warning when it is determined that there is an abnormality in the mechanism of the machine tool 1.

In the present embodiment, M codes for setting commands for a detection start point and a detection end point of at least one of vibration, acoustic waves, and a current value of a servo motor are provided in M codes which are auxiliary functions for performing machining, for example.

When M codes for setting commands for a detection start point and a detection end point of at least one of vibration, acoustic waves, and a current value of a servo motor are selected, the detection start/end command setting unit 18 adds a detection start point and a detection end point to a machining program according to the set commands of the M codes.

By using M codes as means for setting the commands for the detection start point and the detection end point and using macros (variables, computation commands, conditional branching, and the like) appropriately in combination, an operator can freely start and end measurement during a machining program and can automatically measure at least one of the vibration, the acoustic waves, and the current value of the servo motor when performing machining using a machining program in which it is desired to perform measurement.

That is, by using M codes which have been used in a numerical control field of machine tools, for example, as means for setting the commands for a detection start point and a detection end point, it is possible to easily apply the M codes to a machining program.

In a tool management system of a machine tool according to the present invention, the means for setting the commands for a detection start point and a detection end point is not necessarily limited to the M code. For example, the commands for a detection start point and a detection end point may be set using macro functions (macro variables and the like). Moreover, M codes and macro functions may be used together. That is, macro variables for measurement other than M codes may be prepared so that a macro variable #000=1 corresponds to start of detection and a macro variable #000=0 corresponds to end of detection. Such a program may be used as a subprogram so that the subprogram can be called. However, when methods other than M codes are used, it may be necessary to prepare logics individually and a lot of labor is required for creating a program. Moreover, readability may decrease.

In the present embodiment, a plurality of machine tools 1 are provided in a plant, and the plurality of machine tools 1 are managed centrally by a central management unit 21 of a central management room. The preventive maintenance system A of the machine tool includes a plant central management screen display unit 22 that shows a machine tool 1 which is determined to be abnormal on a plant central management screen when the abnormality determination unit 14 determines that an abnormality has occurred, and a machine tool screen display unit 23 provided in the machine tool 1 determined to be abnormal to indicate that there is an abnormality in the machine tool 1.

Here, the machine tool 1 of the present embodiment includes a control device (a control system) 30 including a first control unit (for example, a numerical controller (CNC)) 25 for controlling a machine tool body (the machine tool 1), a second control unit (for example, PMC) 26 that outputs signals to an auxiliary device (for example, the automatic tool changer 9 or the like) of the machine tool body via an I/O unit to perform control according to a sequence program included in the numerical controller, and a third control unit (an external controller) 27 that determines whether it is necessary to change the tool 3 on the basis of the vibration, the acoustic waves, and the current value detected during operation of the machine tool 1 by the vibration detection unit 13, the sound detection unit 15, and the servo motor current value detection unit 16.

The preventive maintenance system A of the machine tool includes a detection information file forming unit 28 that creates files that associate a detection result of at least one of the vibration, the acoustic waves, and the current value of the servo motor with the tool data and the machining information stored in the storage unit 17, and a file output unit 29 that outputs the files created by the detection information file forming unit 28 to an external device. The external device to which the files are output is a plant central management room, a machine tool, or the like, for example.

In the preventive maintenance system A of the machine tool of the present embodiment, the detection start/end command setting unit 18 is provided in the first control unit 25, for example. The determination result display unit 19, the warning unit 20, the machine tool screen display unit 23, the storage unit 17 that stores the vibration, the acoustic waves, and the current value and the vibration, the acoustic waves, and the current value in a normal state, the detection information file forming unit 28, and the file output unit 29 are provided in the second control unit 26. The abnormality determination unit 14 is provided in the third control unit 27. The control device 30 may not necessarily include the first control unit 25, the second control unit 26, and the third control unit 27 individually. The means (units) provided in the control units 25, 26, and 27 are not limited to the above.

In the preventive maintenance system A of the machine tool according to the present embodiment having the above-described configuration, an operator or the like sets an M code of the detection start point and an M code of the detection end point of the vibration, the acoustic waves, and the current value of the servo motor 4, of the machining program with the aid of the detection start/end command setting unit 18 of the first control unit 25.

The set commands for the M code of the detection start point and the M code of the detection end point are sent to the second control unit 26, and the second control unit 26 specifies and extracts information such as a machine number, a program number, a sequence number, a tool number, and a spindle, information on vibration, acoustic waves, and a current value in a normal state, and information (a reference list) or the like such as files that associate tool data created in the past, machining information, and a tool selected arbitrarily with vibration, acoustic waves, and a current value from the storage unit 17, allows the abnormality determination unit 14 of the third control unit 27 to acquire (for example, by downloading) these pieces of information, and sets a measurement start flag. In this way, detection and measurement of vibration, acoustic waves, and a current value by the vibration detection unit 13, the sound detection unit 15, and the servo motor current value detection unit 16 start.

In this case, the abnormality determination unit 14 of the third control unit 27 can acquire these pieces of information. When measurement can be started, the third control unit 27 notifies the second control unit 26 of this and an OK flag is set. When download or the like is not completed properly and measurement cannot be started, the third control unit 27 notifies the second control unit 26 of this and an NG flag is set. In this way, in a stage in which an OK flag is confirmed by the second control unit 26, the first control unit 25 starts machining. When an NG flag is set by the second control unit 26, the warning unit 20 issues a warning (an alarm) such as displaying a PMC alarm and turning on a warning light so that an operator recognizes this.

On the other hand, during operation of the machine tool 1, measurement data (input data) of the vibration, the acoustic waves, and the current value of the servo motor measured by the vibration detection unit 13, the sound detection unit 15, and the servo motor current value detection unit 16 is compared with reference data (vibration, acoustic waves, and a current value in a normal state) by the abnormality determination unit 14 of the third control unit 27. When the measurement data exceeds a threshold set in advance for the reference data, it is determined that an abnormality has occurred, and a determination result is sent to the second control unit 26 and the first control unit 25.

In this case, the measurement data is compared with the vibration, the acoustic waves, and the current value in an abnormal state of respective mechanisms stored in the storage unit 17, and a mechanism in which an abnormality has occurred (it is highly likely that an abnormality has occurred) is determined.

Furthermore, operation of the machine tool 1 is stopped, and the warning unit 20 issues a warning such as displaying a PMC alarm and turning on a warning light and allows an operator or the like to recognize that an abnormality has occurred in a mechanism of the machine tool 1.

When the measurement data does not exceed the threshold and a detection end point is reached (that is, a detection end point is reached without detecting an abnormality), a notification of the end of measurement is issued from the first control unit 25 to the second control unit 26, and an OK flag and an NG flag are removed.

When an abnormality has occurred and a detection end point has been reached without exceeding a threshold, in a state in which measurement ends, the detection results of the vibration, the acoustic waves, and the current value of the servo motor, the determination results, and the like are overwritten to the reference list and are stored in the storage unit 17.

When the abnormality determination unit 14 determines that there is an abnormality, the plant central management screen display unit 22 shows the machine tool 1 in which an abnormality has occurred on the plant central management screen. Moreover, the machine tool screen display unit 23 shows that an abnormality has occurred in the machine tool 1.

Therefore, in the preventive maintenance system A of the machine tool of the present embodiment, it is possible to detect the current value of the servo motor 4 or vibration and sound produced by the telescopic cover 10, the ATC shutter 12, and the like for preventing cutting chips and cutting liquid from adhering the spindle 2 and the feed axis 5 that support the tool 3 of the machine tool 1, the tool magazine 11, and the like to protect the mechanisms and automatically detect an abnormality in the mechanism.

In this way, it is possible to make determination of presence of an abnormality mechanically and automatically, which has conventionally been performed on the basis of the feeling of an operator and detect an abnormality more accurately in an earlier stage.

Moreover, it is possible to detect an abnormality in a mechanism with high accuracy by appropriately combining the three detection factors including vibration, acoustic waves, and a current value of a servo motor.

Here, when there is an abnormality in the work W or the tool 3, for example, as well as when there is an abnormality in a mechanism of the machine tool 1, the vibration, the acoustic waves, and the current value detected by the vibration detection unit 13, the sound detection unit 15, and the servo motor current value detection unit 16 during operation of the machine tool 1 may be different from (may exceed the thresholds) of the vibration, the acoustic waves, and the current value in a normal state.

In contrast, in the preventive maintenance system A of the machine tool according to the present embodiment, rather than simply detecting the vibration, the acoustic wave, and the current value of the servo motor 4 and estimating and predicting the presence of an abnormality in a mechanism on the basis of the detection values, when a detection value different from (exceeding a threshold) the value in a normal state is detected, the measurement data of the detected vibration, acoustic waves, and current value is compared with the data when there is an abnormality in the work W or the tool 3 on the basis of the information stored in the storage unit 17 when there is an abnormality in the work W or the tool 3, it is specified that the measurement data corresponds to a vibration waveform, an acoustic waveform, and a current value waveform when there is an abnormality in the mechanism of the machine tool 1, and the abnormality determination unit 14 determines the presence of an abnormality in the mechanism. In this way, it is possible to specify the presence of an abnormality in a mechanism with high accuracy.

In the preventive maintenance system A of the machine tool according to the present embodiment, since the detection start/end command setting unit 18 can add commands for a detection start point and a detection end point to the machining program, it is possible to determine an abnormality in a mechanism at an appropriate timing during operation of the machine tool 1. Specifically, for example, since the detection start/end command setting unit 18 can add commands for a detection start point and a detection end point to the machining program, it is possible to start measurement at a machining start position of an arbitrary machining path which is likely to be affected from wearing of a tool such as rigidity of the work W or the structure of a jig and to end measurement at a machining end position. In this way, it is possible to reduce machining defects resulting from wearing of a tool. Moreover, since data can be acquired in necessary positions only, it is possible to make determination accurately. That is, it is possible to make determination with high reliability.

In the preventive maintenance system A of the machine tool according to the present embodiment, the commands for a detection start point and a detection end point of vibration, acoustic waves, and a current value are set using M codes (macro variables or the like). In this way, an operator can freely set the start and the end of measurement in a machining program. Moreover, when machining is performed using a machining program in which it is desired to perform measurement, measurement can be performed automatically. Furthermore, it is possible to easily apply the M codes to a program, it is not necessary to prepare logics individually, it will not be difficult to create a program, and it is possible to maintain and secure readability suitably.

In the preventive maintenance system A of the machine tool according to the present embodiment, the determination result display unit 19 can display the results (results indicating the presence of an abnormality) of comparison between the vibration, the acoustic waves, and the current value of the servo motor 4 detected during operation of the machine tool 1 and predetermined thresholds by applying the results to a reference list. The warning unit 20 can allow an operator or the like to reliably recognize that an abnormality has occurred in a mechanism. Moreover, an operator or the like can determine in advance the degree of deterioration or life the mechanism has reached and whether it is likely that a threshold is exceeded when the mechanism is used in subsequent machining and can determine the necessity and the time for maintenance or the like on the basis of the determination results by checking the reference list.

The plant central management screen display unit 22 can show a machine tool in which an abnormality has occurred on a plant central management screen when the abnormality determination unit 14 determines that an abnormality has occurred in the mechanism. The machine tool screen display unit 23 can show that an abnormality has occurred in the machine tool 1. In this way, it is possible to perform management and maintenance of the machine tool 1 efficiently and effectively.

Therefore, according to the preventive maintenance system A of the machine tool of the present embodiment, it is possible to suppress occurrence of defective products and improve productivity.

While an embodiment of the preventive maintenance system of the machine tool according to the present invention has been described, the present invention is not limited to the embodiment but can be changed appropriately without departing from the spirit thereof.

EXPLANATION OF REFERENCE NUMERALS

1: Machine tool
2: Spindle
3: Tool
4: Servo motor
5: Feed axis
6: Driving device
9: Automatic tool changer (ATC)
10: Telescopic cover
11: Tool magazine
12: ATC shutter
13: Vibration detection unit (Detection unit)
14: Abnormality determination unit
15: Sound detection unit (Detection unit)
16: Servo motor current value detection unit (Detection unit)
17: Storage unit
18: Detection start/end command setting unit
19: Determination result display unit
20: Warning unit
21: Central management unit
22: Plant central management screen display unit
23: Machine tool screen display unit
25: First control unit
26: Second control unit
27: Third control unit
28: Detection information file forming unit
29: File output unit
30: Control device (Control system)
A: Preventive maintenance system of machine tool
W: Work

What is claimed is:
1. A preventive maintenance system of a machine tool, comprising:
   at least one detection unit among:
   a vibration detection unit attached to a mechanism of a machine tool to detect vibration;
   a sound detection unit provided in the vicinity of the mechanism of the machine tool to detect acoustic waves produced during operation of the machine tool; and
   a servo motor current value detection unit that detects a current value of a servo motor of a driving device of the machine tool;
   an abnormality determination unit that compares at least one detection value among the vibration detected by the vibration detection unit, the acoustic waves detected by the sound detection unit, and the current value detected by the servo motor current value detection unit during operation of the machine tool with at least one piece of data among vibration data, acoustic wave data, and current value data of the servo motor in a normal state acquired in advance to determine presence of an abnormality in the mechanism; and
   a detection start/end command setting unit that adds commands for a detection start point and a detection end point of at least one of the vibration, the acoustic waves, and the current value of the servo motor to a machining program, wherein when based on a comparison result that the at least one detection value is different from the at least one piece of data in the normal state, the abnormality determination unit compares the at least one detection value among the vibration detected by the vibration detection unit, the acoustic waves detected by the sound detection unit, and the current value detected by the servo motor current value detection unit during operation of the machine tool with at least one piece of data among vibration data, acoustic wave data, and current value data of the servo motor in an abnormality state acquired in advance to determine the presence of an abnormality in the mechanism, if the abnormality determination unit determines that measurement of the at least one detection value can be started, an OK flag is set, and the abnormality determination unit determines that measurement of the at least one detection value can be started if it successfully acquires the at least one piece of data in the normal state, if the abnormality determination unit determines that measurement of the at least one detection value cannot be started, an NG flag is set, and the abnormality determination unit determines that measurement of the at least one detection value cannot be started if it does not acquire the at least one piece of data in the normal state, and the mechanism includes an ATC shutter for protecting a tool magazine, a telescopic cover for preventing adhesion of cutting chips and/or cutting liquid produced due to machining, and a spindle that supports a tool, and the at least one detection unit is positioned on at least one of the ATC shutter or the telescopic cover.

2. The preventive maintenance system of the machine tool according to claim 1, wherein M codes for setting the commands for the detection start point and the detection end point of at least one of the vibration, the acoustic waves, and the current value of the servo motor are provided in the machining program, and the detection start/end command setting unit sets the detection start point and the detection end point according to the set commands of the M codes which are auxiliary functions for performing the machining.

3. The preventive maintenance system of the machine tool according to claim 1, further comprising:

a determination result display unit that displays comparison results between at least one of the vibration, the acoustic waves, and the current value of the servo motor detected during operation of the machine tool and at least one of the vibration data, the acoustic wave data, and the current value data of the servo motor in a normal state set in advance by applying the comparison results to a reference list; and a warning unit that issues a warning when it is determined that there is an abnormality in the mechanism of the machine tool.

4. The preventive maintenance system of the machine tool according to claim 3, wherein the warning unit issues an other warning if the NG flag is set.

5. The preventive maintenance system of the machine tool according to claim 1, wherein a plurality of machine tools are provided in a plant, and the preventive maintenance system includes a plant central management screen display unit that shows the machine tool which is determined to be abnormal by the abnormality determination unit on a plant central management screen.

6. The preventive maintenance system of a machine tool according to claim 1, wherein when the abnormality in the mechanism is determined and a detection end point has been reached without exceeding a threshold set in advance, writing the at least one detection value to a reference list containing the at least one piece of data among vibration data, acoustic wave data, and current value data of the servo motor in the abnormality state acquired in advance to determine presence of the abnormality in the mechanism, and the threshold is based on the at least one piece of data among vibration data, acoustic wave data, and current value data of the servo motor in the abnormality state.

7. A preventive maintenance system of a machine tool, comprising:

at least one detection unit among:

a vibration detection unit attached to a mechanism of a machine tool to detect vibration;

a sound detection unit provided in the vicinity of the mechanism of the machine tool to detect acoustic waves produced during operation of the machine tool; and a servo motor current value detection unit that detects a current value of a servo motor of a driving device of the machine tool;

an abnormality determination unit that compares at least one detection value among the vibration detected by the vibration detection unit, the acoustic waves detected by the sound detection unit, and the current value detected by the servo motor current value detection unit during operation of the machine tool with at least one piece of data among vibration data, acoustic wave data, and current value data of the servo motor in a normal state acquired in advance to determine presence of an abnormality in the mechanism; and a detection start/end command setting unit that adds commands for a detection start point and a detection end point of at least one of the vibration, the acoustic waves, and the current value of the servo motor to a machining program, wherein when based on a comparison result that the at least one detection value is different from the at least one piece of data in the normal state, the abnormality determination unit compares the at least one detection value among the vibration detected by the vibration detection unit, the acoustic waves detected by the sound detection unit, and the current value detected by the servo motor current value detection unit during operation of the machine tool with at least one piece of data among vibration data, acoustic wave data, and current value data of the servo motor in an abnormality state acquired in advance to determine the presence of an abnormality in the mechanism, if the abnormality determination unit determines that measurement of the at least one detection value can be started, an OK flag is set, and the abnormality determination unit determines that measurement of the at least one detection value can be started if it successfully acquires the at least one piece of data in the normal state, if the abnormality determination unit determines that measurement of the at least one detection value cannot be started, an NG flag is set, and the abnormality determination unit determines that measurement of the at least one detection value cannot be started if it does not acquire the at least one piece of data in the normal state, and the mechanism includes an ATC shutter for protecting a tool magazine, a telescopic cover for preventing adhesion of cutting chips and/or cutting liquid produced due to machining, and a spindle that supports a tool, and the at least one detection unit is positioned on the telescopic cover.

* * * * *